(12) United States Patent
Sharon et al.

(10) Patent No.: US 6,836,658 B1
(45) Date of Patent: Dec. 28, 2004

(54) HIGH DATA RATE SATELLITE COMMUNICATIONS SYSTEM AND METHOD

(75) Inventors: Thomas E. Sharon, Duluth, GA (US); William R. Hafner, Alpharetta, GA (US); Macy W. Summers, Norcross, GA (US)

(73) Assignee: EMS Technologies, Inc., Norcross, GA (US)

( * ) Notice: Subject to any disclaimer, the term of this patent is extended or adjusted under 35 U.S.C. 154(b) by 0 days.

(21) Appl. No.: 09/518,126

(22) Filed: Mar. 3, 2000

(51) Int. Cl.$^7$ .................................................. H04Q 7/20
(52) U.S. Cl. ..................... 455/429; 455/3.01; 370/323
(58) Field of Search ............................. 455/3.01, 3.02, 455/3.06, 3.03, 3.04, 3.05, 13.1, 13.3, 12.1, 427, 428, 429, 430, 431; 342/352; 370/323, 316, 325; 348/901, 6, 10, 12, 13; 709/219, 217, 218

(56) References Cited

U.S. PATENT DOCUMENTS

| | | | |
|---|---|---|---|
| 3,810,255 A | 5/1974 | Wachs et al. | |
| 4,228,401 A | 10/1980 | Wachs et al. | |
| 4,689,625 A | 8/1987 | Barmat | |
| 4,706,239 A | 11/1987 | Ito et al. | |
| 4,813,036 A | 3/1989 | Whitehead | |
| 4,858,225 A | 8/1989 | deSantis | |
| 4,903,126 A | 2/1990 | Kassatly | |
| 4,931,802 A | 6/1990 | Assal et al. ................. 342/356 |
| 5,060,180 A | * 10/1991 | Kingston et al. ............ 708/306 |
| 5,119,225 A | 6/1992 | Grant et al. ................. 359/172 |
| 5,355,529 A | * 10/1994 | Linquist et al. ............. 455/13.1 |
| 5,394,560 A | 2/1995 | Kane | |
| 5,412,660 A | 5/1995 | Chen et al. | |
| 5,424,862 A | 6/1995 | Glynn | |
| 5,425,050 A | * 6/1995 | Schreiber et al. ........... 375/141 |
| 5,428,814 A | 6/1995 | Mort et al. ................. 455/12.1 |
| 5,552,920 A | 9/1996 | Glynn ......................... 359/172 |
| 5,594,780 A | 1/1997 | Wiedeman et al. | |
| 5,625,624 A | * 4/1997 | Rosen et al. ................. 370/307 |
| 5,640,386 A | 6/1997 | Wiedeman | |

(List continued on next page.)

FOREIGN PATENT DOCUMENTS

| | | |
|---|---|---|
| EP | 0 536 628 A1 | 4/1993 |
| EP | 0 748 064 A2 | 12/1996 |
| EP | 0 883 252 A2 | 12/1998 |
| EP | 0 967 745 A2 | 12/1999 |

OTHER PUBLICATIONS

Clausen et al., "Internet Services via Direct Broadcast Satellites," Phoenix/Tempe, Feb. 5–7, 1997, New York, IEEE, US, published Feb. 5, 1997, pp. 468–475.

Horst D. Clausen, Bernhard Nocker, "Internet Services via Direct Broadcast Satellites", May 2, 1997, pp. 468–475.

(List continued on next page.)

*Primary Examiner*—Tilahun Gesesse
(74) *Attorney, Agent, or Firm*—King & Spalding LLP (57) ABSTRACT

A spot beam satellite communications system and method for delivering information to user terminals at a high data rate. In a hub, a high data rate serial data stream is separated into parallel data streams that are modulated onto respective uplink transponders. The uplink transponders are transmitted by the hub to an earth-orbiting satellite, which translates the uplink signals to downlink frequencies. The satellite broadcasts the transponders to user terminals located in the desired beam coverage areas on the earth. The user terminal separates the downlink transponders and demodulates each of the downlink transponder signals to regenerate the parallel data streams. The parallel data streams are combined to reproduce the original serial data stream. By dedicating multiple transponders to a particular data stream, data can be relayed at a very high data rate by a communications satellite that employs a standard transponder frequency assignment scheme.

42 Claims, 9 Drawing Sheets

U.S. PATENT DOCUMENTS

| | | | |
|---|---|---|---|
| 5,680,240 A | | 10/1997 | Glynn |
| 5,687,166 A | * | 11/1997 | Natali et al. ................. 370/209 |
| 5,697,050 A | | 12/1997 | Wiedeman |
| 5,737,372 A | * | 4/1998 | Barham et al. ............. 375/145 |
| 5,809,141 A | | 9/1998 | Dent et al. |
| 5,822,312 A | | 10/1998 | Peach et al. |
| 5,864,546 A | | 1/1999 | Campanella |
| 5,864,747 A | * | 1/1999 | Clark et al. .................... 725/67 |
| 5,884,142 A | | 3/1999 | Wiedeman et al. |
| 5,898,681 A | | 4/1999 | Dutta |
| 5,963,862 A | | 10/1999 | Adiwoso et al. |
| 5,995,495 A | * | 11/1999 | Sampson .................... 370/316 |
| 6,078,810 A | * | 6/2000 | Olds et al. ................... 455/428 |
| 6,160,993 A | * | 12/2000 | Wilson ...................... 455/12.1 |
| 6,240,124 B1 | | 5/2001 | Wiedeman et al. |
| 6,246,698 B1 | * | 6/2001 | Kumar ....................... 370/487 |
| 6,256,496 B1 | | 7/2001 | Dintelmann et al. |
| 6,278,876 B1 | | 8/2001 | Joshi et al. |
| 6,314,289 B1 | * | 11/2001 | Eberlein et al. ............ 455/427 |
| 6,415,329 B1 | | 7/2002 | Gelman et al. |
| 6,456,782 B1 | * | 9/2002 | Kubota et al. ................ 386/98 |
| 6,496,682 B2 | | 12/2002 | Butte et al. |
| 6,542,479 B1 | * | 4/2003 | Boudier et al. ............. 370/319 |
| 6,549,162 B1 | * | 4/2003 | Gage et al. ................. 342/353 |
| 6,549,774 B1 | * | 4/2003 | Titlebaum et al. .......... 455/427 |
| 6,570,859 B1 | * | 5/2003 | Cable et al. ................. 370/323 |
| 6,584,082 B1 | * | 6/2003 | Willis et al. ................ 370/316 |
| 2003/0109220 A1 | | 6/2003 | Hadinger et al. |

OTHER PUBLICATIONS

International Search Report, PCT/US01/06435, European Patent Office, Jul. 20, 2001.

"High Definition Desktop", *Business 2.0*, Jan. 2000.

"Geocast: About Us" and "Geocast: FAQ", Geocast Network Systems, Inc., http://www.geocast.com/about/index.html.

Elbert, Bruce R., "Introduction to Satellite Communication", $2^{nd}$ Edition, Norwood, MA, 1999, pp. 77–120.

"Microstar® *Plus* Millimeter Wave Radio: 38 GHz North American Digital Hierarchy," Harris Corporation, Quebec, Canada, Jul. 1996.

Martin et al., "Broadband Wireless Services from High Altitude Long Operation(HALO™) Aircraft," Proceedings of the SPIE, U.S., SPIE, Bellingham, VA, vol. 3232, Nov. 5, 1997, pp. 9–20, No. XP002093950.

Garg et al., "Cost Effective Personal Communications Using Geo–Synchronous Satellite," IEEE International Conference on Personal Wireless Communications Proceedings, 1996, p. 289, No. XP002082547.

International Search Report in related PCT Application No. PCT/US00/25878, mailed Apr. 20, 2001.

* cited by examiner

HIGH DATA RATE SATELLITE COMMUNICATIONS SYSTEM AND METHOD

FIELD OF THE INVENTION

This invention relates to satellite communications systems using multiple spot beams to selectively broadcast high bit rate broadband information to user terminals located within desired coverage areas and, more particularly, to a satellite communications system in which a high bit rate broadband data stream is divided into multiple data streams in a hub for delivery to user terminals located within desired coverage areas via a multiple-transponder satellite.

BACKGROUND OF THE INVENTION

Satellites are used extensively for a variety of communications applications as a result of some well-recognized benefits. The most important communications advantage that satellites enjoy is that they are in view of a large amount of the earth's surface. A geosynchronous satellite is in view of about one-third of the earth's surface, for example.

In addition, large amounts of frequency spectrum have been allocated to satellites for communications in the microwave and millimeter wave frequencies. For example, at C and Ku bands, the available spectrum for satellite communications is on the order of one GHz. That bandwidth can be made available to users located in the field of view of the satellite and can be multiplied through a variety of frequency reuse techniques.

Moreover, because satellite communications are carried out using radio frequencies through free space, mobile user terminals can be deployed. At the common satellite communications frequencies of C and Ku band, reasonably sized antennas and low cost user terminal hardware are readily available.

The advantages of satellite communications have been enjoyed by users in several types of applications. For example, cable TV networks deliver high bandwidth video programming to head-end distribution points around the world, and national retailers use VSAT networks to accept and distribute data to and from retail stores throughout the country.

Figure 1:
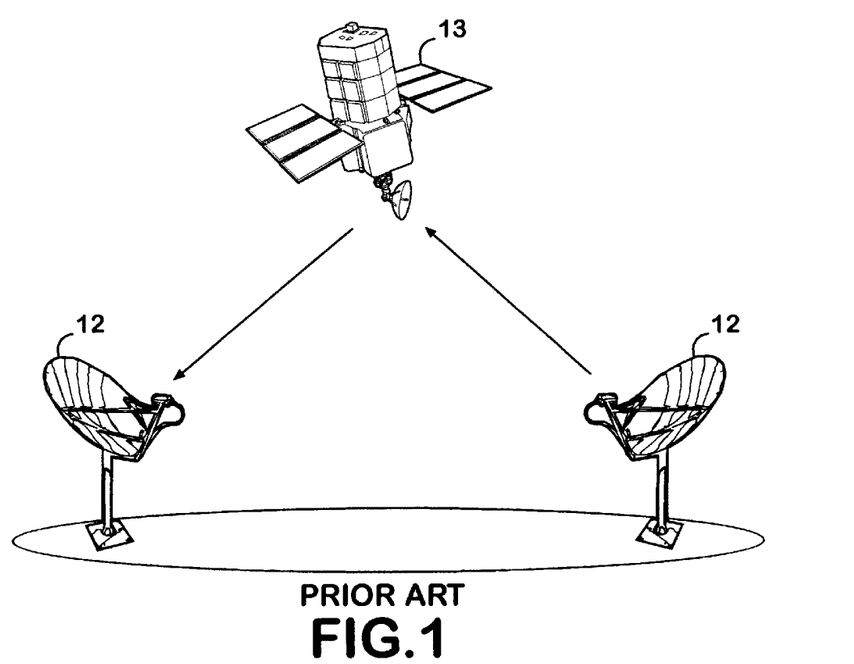
FIG. 1 is a schematic diagram illustrating a prior art system for point-to-point communications between terminals in a satellite communications system.

The first applications of communications satellites were in point-to-point communications links between fixed pairs of earth stations 12. As shown in FIG. 1, communications from one earth station to the other is via a dedicated path over the satellite 13. As a result, two links are needed in order to provide full duplex communications. Before the advent of underseas fiber optic cable, many international telephone calls were accomplished with point-to-point satellite links.

Figure 2:
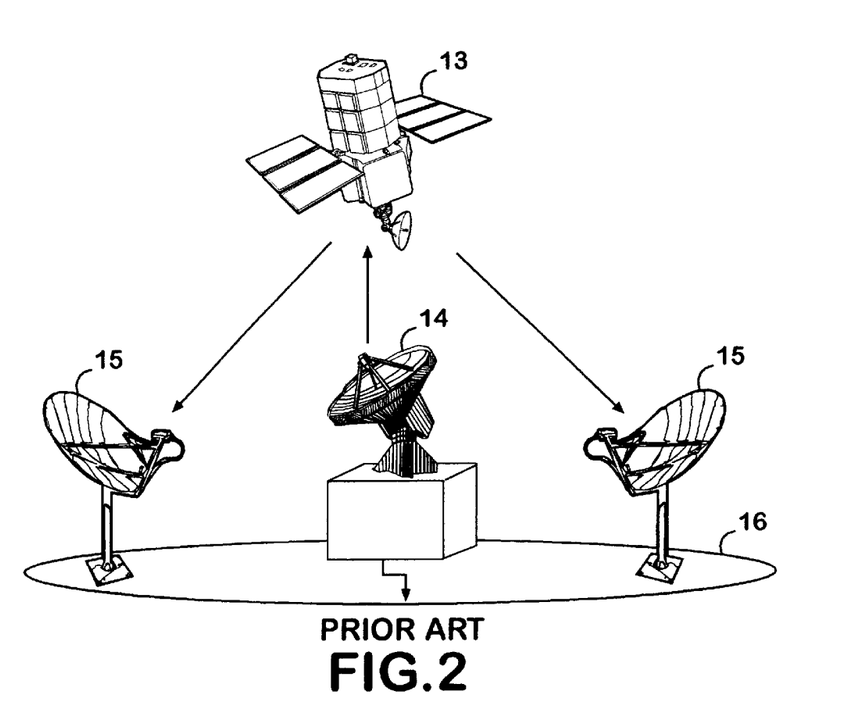
FIG. 2 is a schematic diagram illustrating a prior art system for providing communications from a central hub to terminals in a broadcast satellite communications system.

Today, satellites are more commonly used for point-to-multipoint, or broadcast, applications as illustrated in FIG. 2. In FIG. 2, the information to be broadcast to a number of receivers within the field of view of the satellite is delivered to a hub 14 which then uplinks the information to the satellite 13. The satellite then relays the information to user terminals 15 located within a broad coverage footprint 16 on the earth. For example, television programming from a single network hub can be delivered to numerous ground-based broadcasters or cable operators by a geosynchronous satellite. Such broadcast applications take full advantage of the wide area coverage provided by geosynchronous satellites. Every television station in the United States owns and operates at least one broadcast receive terminal, and many stations own uplink terminals to deliver news feeds via satellite. Television programming is most commonly distributed using the C band of frequencies.

Today, roughly one-third of all satellite transponders are dedicated to the distribution of cable television programming. A typical cable system head-end in the United States will continuously receive 30 to 50 satellite-delivered video channels coming from several different satellites. To control access by cable subscribers to the individual channels, the programming is typically encoded at the uplink using standards developed by the Motion Picture Experts Group (MPEG) or according to one of the digital video broadcasting (DVB) standards. The receiving site at the cable system head-end then requires a decoder for each channel being recovered.

Direct-to-home video distribution systems such as the Hughes DirecTV system typically employ high-power Ku band satellites using the BSS channel plan. Under that plan, each orbit position has 32 channels assigned to it. A satellite might transmit 16 channels at one time, thus requiring that two satellites be operated in the same slot. The full complement of 32 channels of about 27 MHz each can deliver between 150 and 250 compressed digital video channels. In the late 1990s, the DirecTV system and other direct-to-home systems were augmented with data broadcasting to provide Internet access. In such systems, the data is typically transmitted in packets to allow the information to be addressed to individual receivers.

Various schemes for broadcasting digital data are known. In one analog technique, a low data rate data stream is inserted into the vertical blanking interval of the video transmission. The data is then removed from the video signal by a special decoder unit connected to the display terminal. In another known approach for digital data broadcasting, a medium data rate data stream is modulated onto a baseband subcarrier, and the receiving user terminal recovers the data with a subcarrier receiver and decoder. These systems suffer from bandwidth limitations and from the need for special receivers.

The satellite communications industry has long used the term "transponder" to refer to a defined RF channel of communications within a satellite communications system. A satellite transponder is essentially a microwave relay channel, taking into account the need to translate the frequency of the transponder from an uplink frequency to a downlink frequency. A transponderized satellite payload design breaks up the full downlink frequency band (for example, a 500 MHz band at C band or a 1 GHz band at Ku band) to allow more effective power amplification of the downlink signal by the satellite downlink transmitter. If the transmitter was instead required to accommodate the full bandwidth of the downlink, that requirement would greatly limit the RF output power level available from the transmitter. By dividing the fulldownlink bandwidth into several transponders, or channels, individual amplifiers dedicated to each transponder segment of the downlink (for example, 36 MHz or 54 MHz segments) can be employed and the power level of the full-bandwidth downlink signal can therefore be significantly higher.

In a typical transponderized satellite communications system, the frequency plan of the transponders is coordinated between and among the user terminals, the hub, and the satellite payload. As a result, the information to be relayed over a conventional communication satellite is limited by the bandwidth of a single transponder (which may be 27 MHz, 36 MHz, 54 MHz, for example). As a result, the amount of data that can be delivered to a single receiving terminal through a conventional communications satellite is inherently limited by transponder bandwidth.

Figure 3:
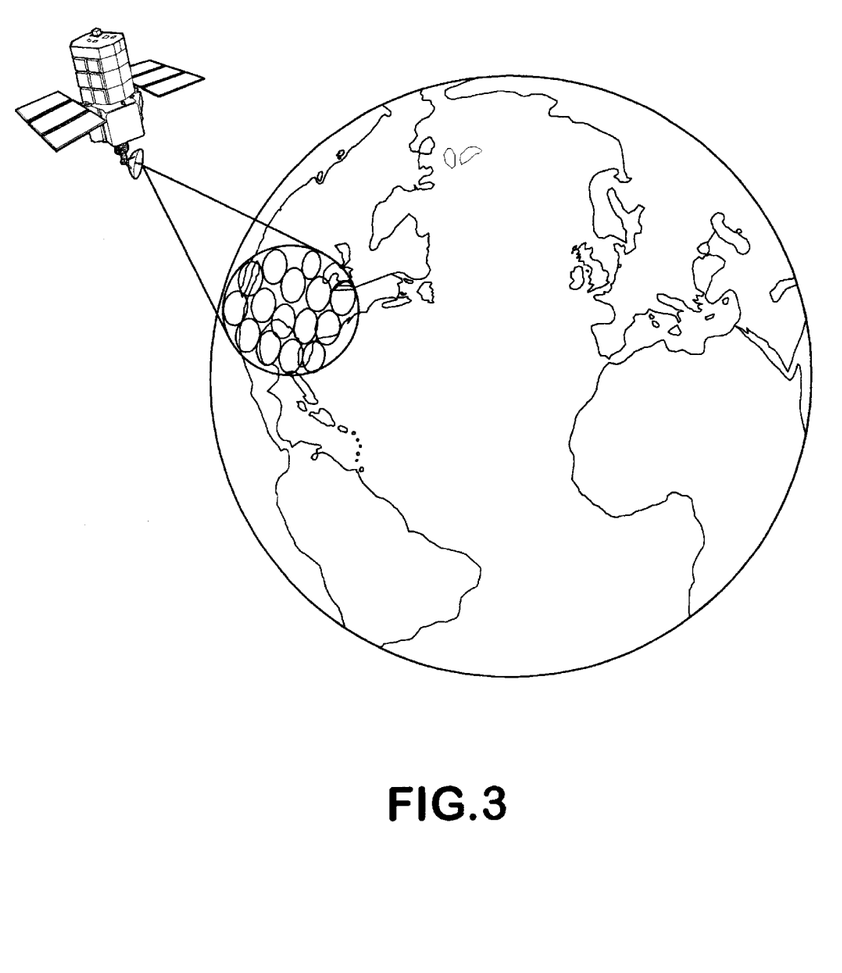
FIG. 3 is a perspective view illustrating the spot coverage areas generated by a communications satellite having a spot beam antenna.
Figure 4:
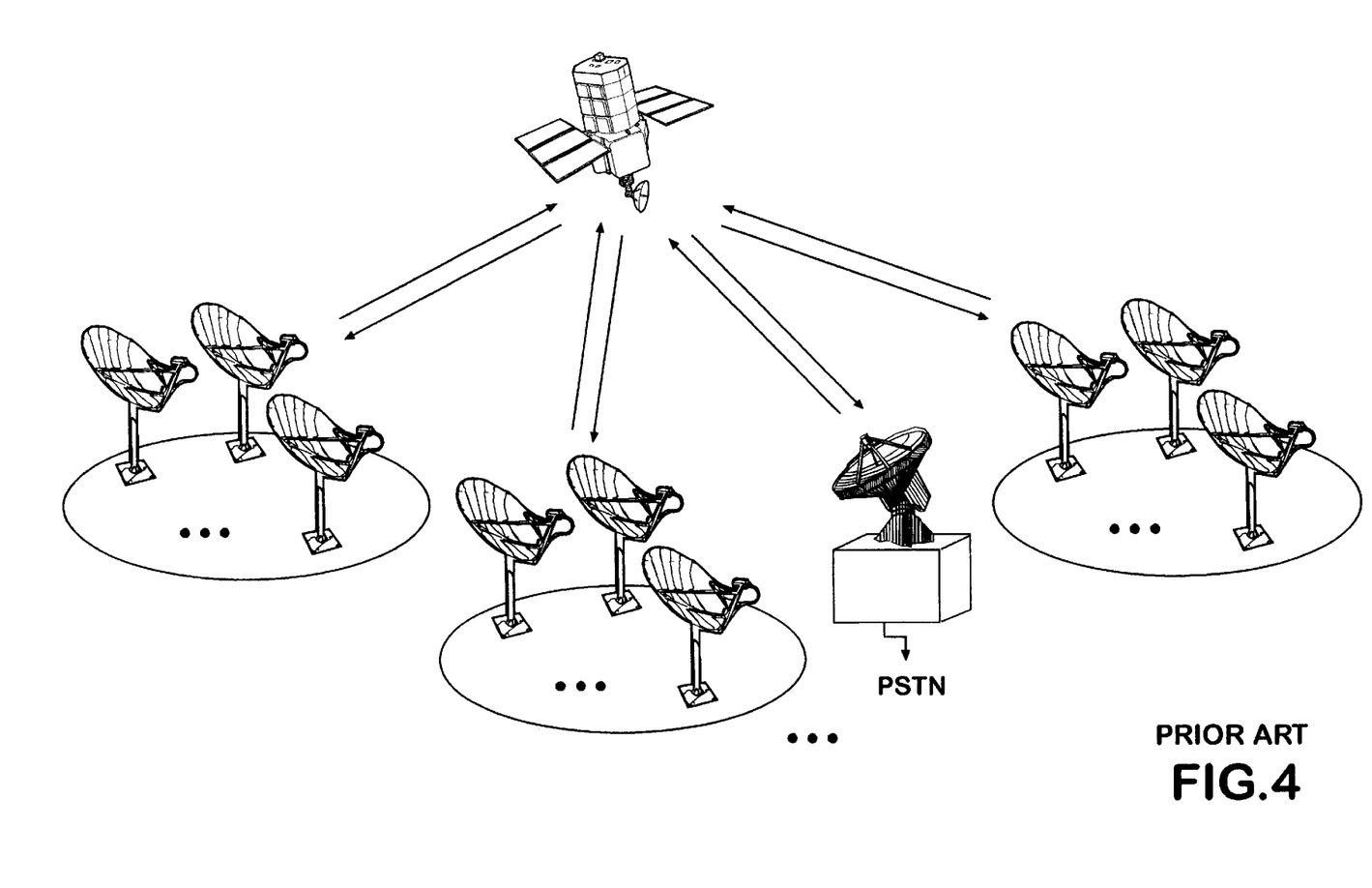
FIG. 4 is a schematic diagram illustrating a prior art spot beam communications satellite system for providing inter-beam communications to terminals via a central hub.

The first geosynchronous communications satellites had uplink and downlink coverage footprints that were coincident with the earth field of view or with major continents in view of the satellite. Antennas for creating full earth coverage patterns are fairly simple and use fairly simple feed horn structures. More recently, switchable spot beam antennas have been developed for satellite communications applications to enable the reuse of the uplink and downlink frequencies across a geographic area. For example, if the United States is divided into multiple spot beam coverage areas, as illustrated in FIG. 3, the full frequency range can be reused in each spot beam coverage area to direct different information to different spot coverage areas. One conventional system for broadcasting information from a communications satellite to user terminals located within a plurality of spot beams is illustrated in FIG. 4.

Spot beams are also employed to deliver more RF power over a smaller spot coverage area in order to reduce the size of the receive antenna required for a user terminal to receive information at a given rate. For example, certain classes of user terminal have been widely deployed for applications such as DirecTV or VSAT, and systems that desire to take advantage of that large installed base can use a spot beam antenna to deliver information to those terminals without requiring a user terminal upgrade. Because of transponder bandwidth limitations, however, there is an inherent limitation on the amount of bandwidth that can be delivered to the terminal that cannot be overcome solely by the use of spot beams. Essentially, the data rate to be delivered to any user terminal within any spot beam is limited by the bandwidth of an individual transponder.

In summary, then, the bandwidth limitations of power amplifiers used in satellite downlink transmitters have resulted in the development of the transponder approach, in which the available RF spectrum is divided into manageable channels, or transponders. The data rate at which data can be delivered over any one transponder is necessarily limited by the bandwidth of the transponder itself. While the use of spot beams has developed in order to take advantage of the existing base of small, low cost user terminals, users in those spot beam coverage areas are still limited in their ability to receive broadband data by the bandwidth of an individual transponder. Known satellite communications systems operating in a broadcast mode therefore suffer from limitations on the data rate at which information may be delivered to user terminals.

Known systems for delivering high bandwidth multimedia content to users at high data rates suffer from a number of other limitations as well. The Geocast system being developed by Geocast Network Systems, Inc. promises to deliver high quality multimedia content to personal computer desktops by using new digital television broadcast spectrum. In the Geocast system, broadband content will be uplinked to a Geocast satellite that will in turn broadcast the content to local TV broadcast stations. Each local station will then broadcast the data over digital television frequencies for receipt by users with specially designed receivers. The special receivers can accept live data feeds or can store content for later retrieval. The Geocast system therefore in principle allows users to overcome the bandwidth limitations of conventional Internet connections, for example. After users customize their receivers to their own interests, preferences, and demographics, the Geocast system matches content to individual receivers and delivers matched content to the receivers for real-time or later viewing.

In principle, then, the Geocast system combines the bandwidth and immediacy of broadcast television with the customization and control enabled by web browsing. Unfortunately, however, the Geocast system suffers from several limitations. First, the special digital television receivers required at each user terminal are expensive. In addition, the bandwidth of Geocast delivery service is limited by the bandwidth of the digital television frequencies.

In summary, then, there is no satisfactory existing solution to the problem of delivering multimedia content in a broadcast mode to users at very high data rates. The present invention provides an advantageous solution to this problem by dedicating multiple transponders to a particular data stream so that data can be relayed at very high data rates using a communications satellite that employs a conventional transponder frequency assignment scheme.

SUMMARY OF THE INVENTION

The present invention enables the delivery of information to users at very high data rates. The invention provides a broadband multicasting system for distributing information at very high data rates (on the order of 500 Mbps, for example) to user terminals located within a satellite downlink spot beam. According to one aspect, the multicasting system can include a hub that has a transmitter that accepts a serial data stream, converts the serial data stream into parallel data streams, and, using individual modulators, modulates respective uplink transponder signals with the parallel data streams. A hub antenna directs the modulated uplink transponder signals through free space.

The multicasting system can further include an earth-orbiting communications satellite that comprises an uplink receive antenna to receive the uplink transponder signals from the hub, a repeater adapted to translate the uplink transponder frequencies to downlink transponder frequencies, and an antenna adapted to direct the downlink transponder signals to the desired coverage area(s) on the earth.

A multicasting system according to the invention could enable several new business and consumer communications applications. For example, an entire day's line-up of prerecorded video programming could be delivered during the previous night, making it possible for consumers to create personalized viewing schedules. Web content could be delivered to geographically-dispersed content caching servers to circumvent Internet congestion and reduce web page delivery times. Updates to software and data could be delivered quickly to distributed servers run by software application service providers and electronic commerce service providers.

According to another aspect of the invention, a method for delivering broadband data to users is provided that includes the steps of separating a broadband serial data stream into parallel data streams and modulating each of the parallel data streams onto respective uplink transponder signals. The method further includes the steps of transmitting the uplink transponder signals to an earth-orbiting satellite, downconverting the uplink transponder signals to respective downlink transponder signals, and transmitting the downlink transponder signals to a coverage area on the earth.

According to yet another aspect of the invention, a user terminal is provided that receives data over multiple transponders transmitted by a communications satellite. The user terminal is located in the desired coverage area on the earth that are produced by an antenna on the communications satellite. The terminal can include a signal splitter that separates transponder signals received from the communications satellite, receivers that demodulate the respective transponder signals to produce a plurality of respective parallel data streams, and a buffer adapted to convert the parallel data streams into a very high data rate serial data stream. The user terminal may employ a small antenna and other low-cost components that have been developed for mass-market high power direct broadcast satellite applications.

According to still another aspect of the invention, a method for receiving broadband information from a multicasting satellite at a user terminal located within the desired coverage area of the satellite is provided. The method includes the steps of separating downlink transponder signals, including subsets of the broadband information, from the multicasting satellite. The method further includes the steps of demodulating each of the separated downlink transponder signals to produce respective parallel data streams and buffering the parallel data streams to produce a serial data stream that contains the broadband information.

According to still another aspect of the invention, a method for receiving broadband information from a multicasting satellite at a two-way interactive user terminal located within the desired coverage area of the satellite is provided. The method includes the steps of separating downlink transponder signals, including subsets of the broadband information, from the multicasting satellite. The method further includes the steps of demodulating each of the separated downlink transponder signals to produce respective parallel data streams and either buffering the parallel data streams or directly combining the parallel data streams to produce a serial data stream that contains the broadband information. The terminal may include a return channel transmitter that transmits a return channel signal back through the satellite for reception at the hub.

The invention provides significant improvements over prior art satellite communications systems by enabling the broadcast distribution of data at very high data rates to widely-deployed user terminals. Multiple transponders are dedicated to a particular data stream so that data can be relayed at a very high data rate by a communications satellite that employs a standard transponder frequency assignment scheme. The satellite multicasting system and method according to the present invention thus provide the ability to broadcast data at a very high data rate to multiple users located within a desired coverage area. According to one embodiment of the invention, assigning many or all of the satellite transponders to deliver this broadband data includes the coordination of modulation scheme and parallel data serialization between an uplink hub and the user terminals.

DETAILED DESCRIPTION OF THE EXEMPLARY EMBODIMENTS

Turning now to the drawings, in which like numerals indicate like elements throughout the several figures, an exemplary embodiment of the invention will now be described in detail. The present invention is directed to the broadcast distribution of information at very high data rates to user terminals within the spot beam coverage area of a communications satellite. Although the preferred embodiment of the invention will be described with respect to the delivery of broadband multimedia content to a user terminal, those skilled in the art will recognize that the invention may be utilized in connection with the delivery of a variety of information to a variety of users under a variety of circumstances. In addition, while the preferred embodiment of the invention will be described with respect to the one-way delivery of content to user terminals, those skilled in the art will recognize that the invention may also be utilized in connection with two-way communications between a hub and a user terminal.

Figure 5:
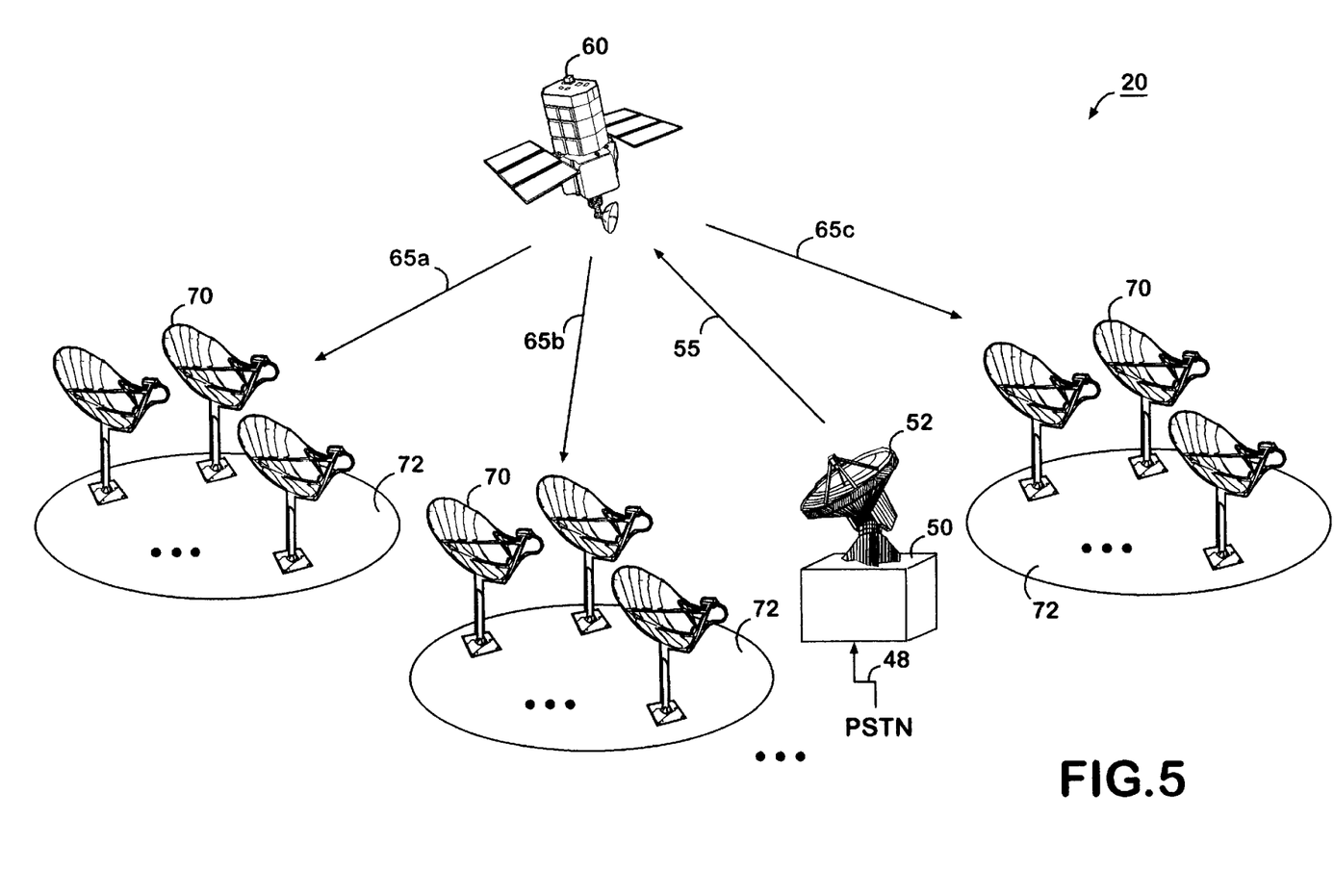
FIG. 5 is a schematic diagram illustrating a multicasting spot beam communications satellite system according to one exemplary embodiment of the present invention.

Referring now to FIG. 5, a satellite multicasting system 20 according to one exemplary embodiment of the present invention is illustrated. A high speed serial data stream 48 is accepted by a hub 50 and converted into a set of parallel data streams each corresponding to a satellite transponder. The parallel data streams are individually modulated onto an RF carrier channel, summed into a composite IF signal, upconverted to the appropriate RF Frequency and transmitted from hub antenna 52 over uplink 55 to multicasting satellite 60.

At the satellite 60, the signal is typically translated to a lower downlink RF frequency and the individual transponder signals are separated in an input multiplexer. Each transponder signal is then typically amplified at the downlink frequency before being recombined in an output multiplexer. The recombined transponders are then transmitted by satellite 60 over downlinks 65*a,b,c* to a user terminals 70 located the desired coverage area 72. The satellite communications payload also typically includes an antenna for forming the desired beam coverage area(s).

User terminals 70 typically include a signal splitter and a set of parallel receivers individually tuned to each of the transponders to separate and demodulate the transponders and to thereby regenerate the parallel data streams that were first generated in hub 50. The parallel data streams may then be stored and/or serialized to regenerate the high data rate serial data stream originally delivered to the hub for multicasting.

One advantage of the multicasting satellite according to the present invention is that multiple transponders can be dedicated to a particular data stream so that data can be relayed at a very high data rate by a communications satellite that employs a standard transponder frequency assignment scheme. The satellite multicasting system according to the present invention thus provides the ability to broadcast data at a very high data rate to multiple users located within a desired beam coverage area. According to one embodiment of the invention, dedicating multiple satellite transponders to deliver this broadband data requires that the modulation scheme and parallel data serialization be coordinated among the hub 50 and the user terminals 70.

Figure 6:
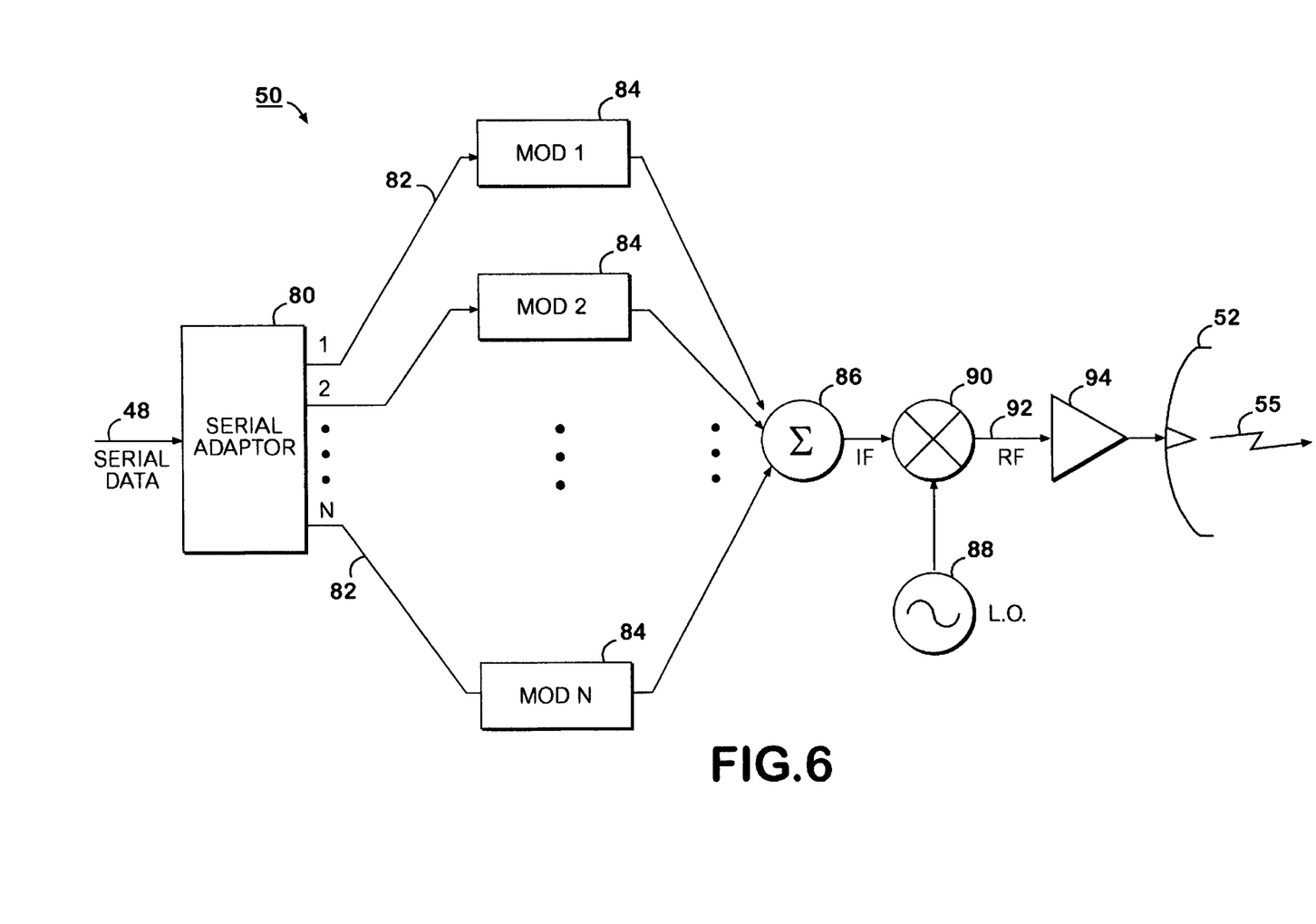
FIG. 6 is a schematic block diagram illustrating a hub data transmitting circuit according to one exemplary embodiment of the present invention.

Referring now to FIG. 6, a schematic diagram of a hub 50 is provided. Serial data 48 embodying broadband information is delivered to the hub as indicated at the left of the figure. Serial adapter 80 converts the serial data stream 48 into several parallel data streams 82 (in the figure, there are N data streams shown). Modulators 84 modulate each of the parallel data streams 82 onto intermediate frequency (IF) carriers, and the modulated carriers are then combined in summer 86. The summed IF signal is then upconverted to an RF signal 92 by mixing a local oscillator signal 88 with the summed IF signal in mixer 90. Power amplifier 94 then amplifies the resulting RF signal 92, and the amplified signal is delivered to hub antenna 52 to be transmitted through free space up to the satellite via uplink 55. In one typical Ku-band application, the RF signal is at a microwave frequency range of 14.0 GHz to 14.5 GHz and each transponder occupies a 36 MHz band within that range. Other RF carrier frequencies and transponder bandwidths may be employed without departing from the invention.

Hub 50 thus channelizes the high speed serial data 48 onto several uplink transponder signals to be delivered to satellite 60 over uplink 55. A number of data modulation schemes may be used, as known to those skilled in the art. For example, modulation according to aDVB or DVB-S protocol may be used, utilizing phase shift keyed modulation such as QPSK, 8PSK or other modulation formats as are known in the art. In one exemplary embodiment of the invention, the serial adapter 80 is capable of converting a data stream having a data rate of M×N bits per second (where M is the bit rate capacity of a single transponder and N is the number of transponders dedicated to the high speed wide bandwidth serial data) in a broadband application such as video and other multimedia. According to another exemplary embodiment, the hub 50 is adapted to coordinate the uplink transponder signal modulation with user terminals 70 within the coverage area 72 for which the broadband data is destined.

Figure 7:
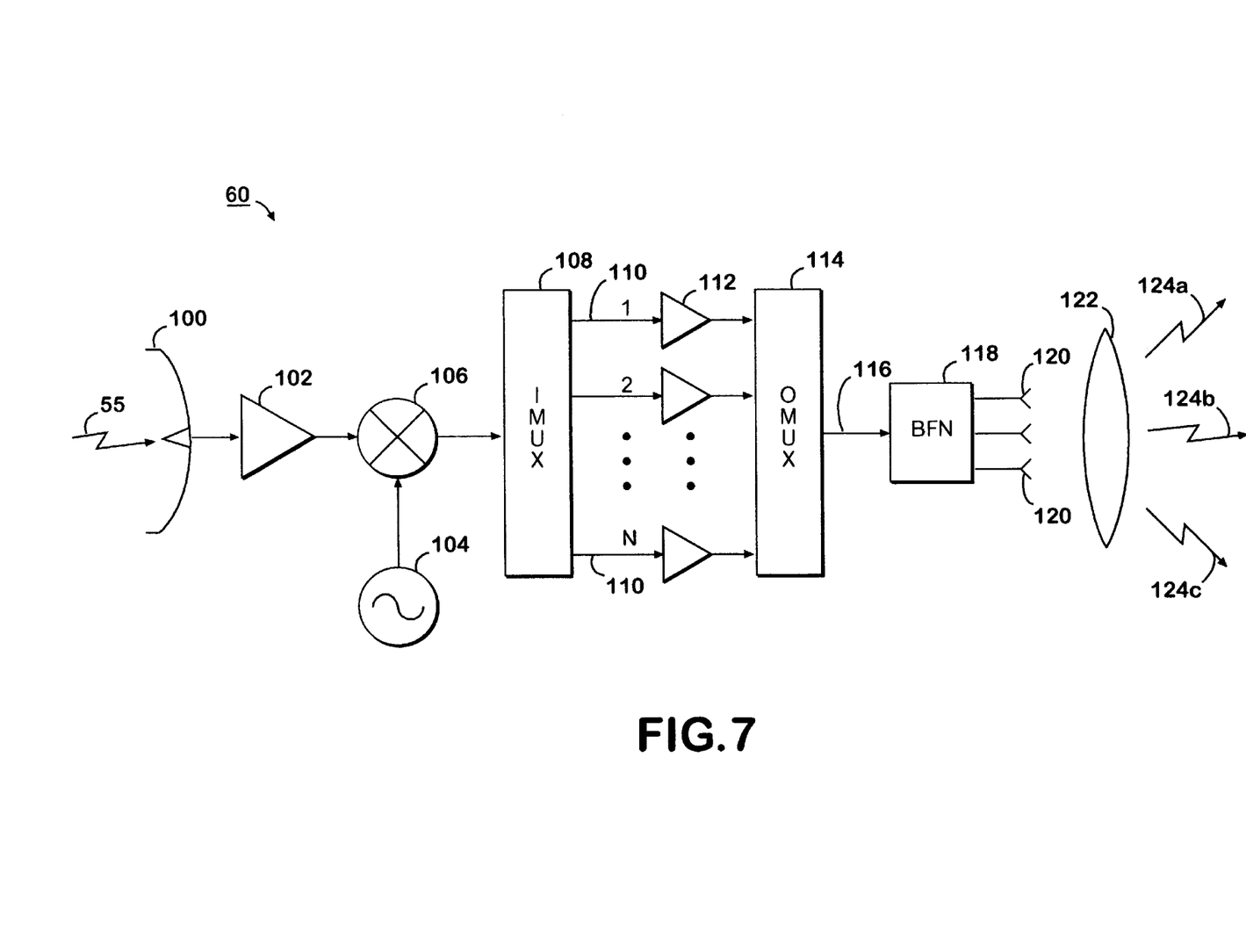
FIG. 7 is a schematic block diagram illustrating a satellite communications payload according to one exemplary embodiment of the present invention.

Referring now to FIG. 7, a schematic diagram of the communications payload for a multicasting satellite 60 according to one advantageous embodiment of the present invention is illustrated. Uplink signal 55 from hub 50 is collected by uplink antenna 100. A low noise amplifier 102 is typically employed to set the noise figure for the system. The uplink signal is then typically mixed with local oscillator 104 in mixer 106 to translate the signal from the uplink frequency to the downlink frequency. In a typical Ku band application, an uplink frequency of 14.0 GHz to 14.5 GHz and a downlink frequency of 11.7 GHz to 12.2 GHz are used. Other RF carrier frequencies may be used without departing from the invention.

After frequency translation, each of the individual transponder signals 110 are then separated by input multiplexer 108, which is typically a complex filter assembly. Individual transponder signals 110 are then amplified by power amplifiers 112 before being recombined in output multiplexer 114. The output multiplexer 114 is typically a low-loss waveguide filter assembly. The downlink transponder signal 116, comprising the amplified and recombined individual transponder signals 110, is then routed through the transmitting antenna assembly. The antenna assembly may be a single aperture for a single desired coverage area or may consist of a beam forming network 118 and feed horns 120 to generate individual spot beams 124 using antenna optics 122. Antenna optics 122 may comprise awaveguide lens, as shown in FIG. 7, or may be a reflector structure or other RF focusing structure. Typically, there is an association between individual feed horns 120 or sets of feed horns 120 and individual spot beams 124. The antenna feeds are thus adapted to form individual downlink beams, and each downlink beam is associated with a spot coverage area 72 on the earth.

Figure 8:
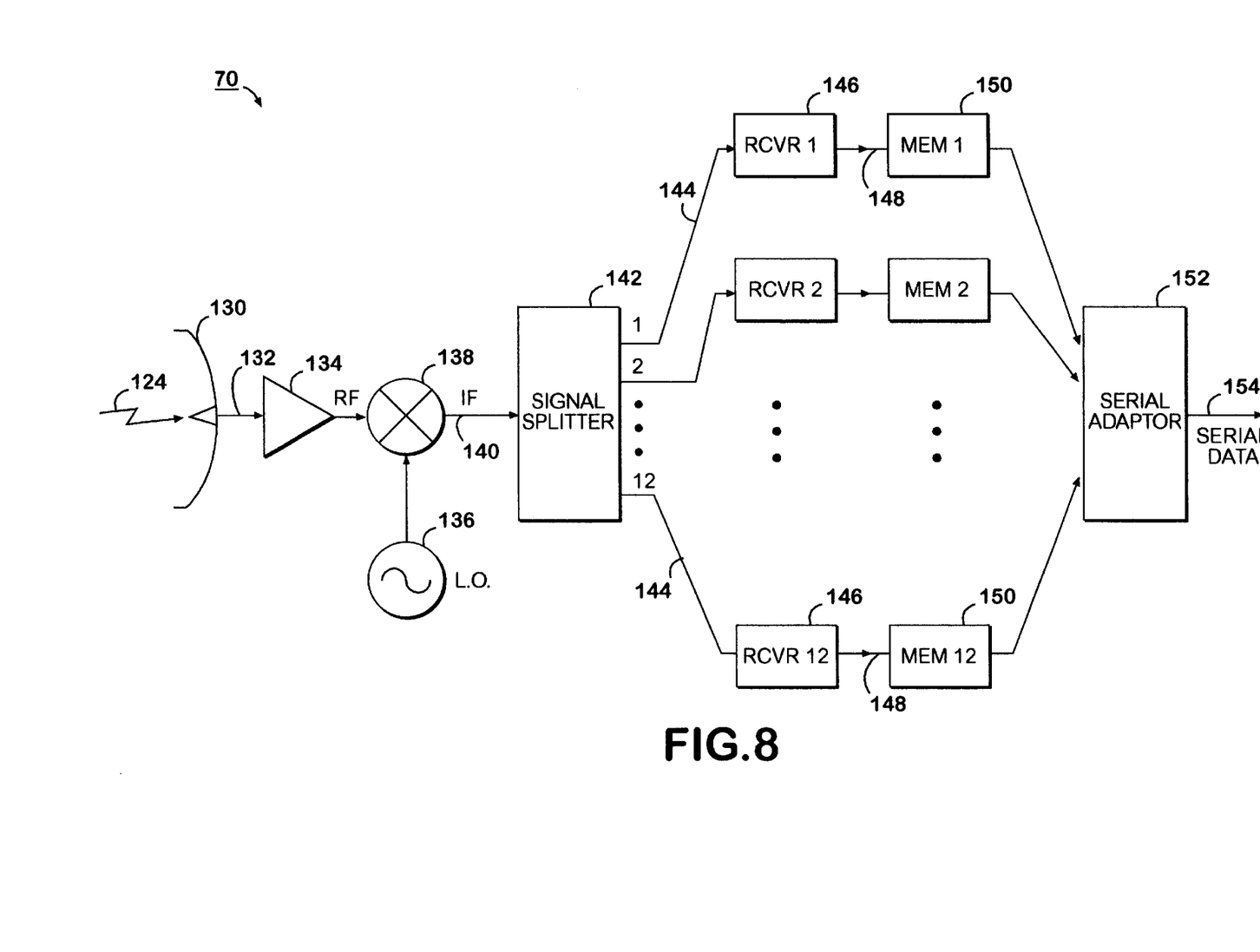
FIG. 8 is a schematic block diagram illustrating a user terminal data receiving circuit according to one exemplary embodiment of the present invention.

Referring now to FIG. 8, a user terminal circuit is illustrated schematically. If user terminal 70 is located in an illuminated desired beam coverage area 72, the downlink beam 124 is collected by user terminal antenna 130. The collected downlink transponder signal 132 is then typically amplified by user terminal low noise amplifier 134 in order to set the noise figure for the user terminal receiver. The downlink transponder signal, which in one exemplary Ku band application is at a frequency of 11.7 GHz to 12.2 GHz, is then downconverted to an IF frequency by mixer 138 using local oscillator 136.

The resulting downlink IF signal 140 is then divided, such as in signal splitter 142 or by another power divider as is known in the art, and the divided IF signals 144 are then delivered to individual receivers 146 each tuned to a respective transponder frequency. If receiver demodulation is properly coordinated with the parallel data stream modulation performed by the hub 50, then the demodulated outputs of the receivers are replicas of the respective parallel data streams generated in the hub.

In one exemplary embodiment, each of the parallel data streams 148 is then stored in a memory 150 such as a hard disk drive or other storage device known in the art. The original high speed serial data stream may then be regenerated by combining each of the parallel data streams 148 from memories 150 in a serial adapter 152. Alternatively, the serial data stream may be reconstituted in real time by applying the output of the receivers 146 directly to the serial adapter 152 to generate the high speed serial data stream 154. Again, coordination between the hub 50 and each of the user terminals 70 is preferable in order to coordinate modulation and demodulation schemes and serial adapter sequencing.

It should be noted that the serial adapter 152 alone or in combination with memories 150 may constitute a buffer. Ideally, the serial adapter or other serial interface is adapted to convert the parallel data streams into a serial data stream 154 with a serial data rate of at least M×N bits per second (where M is the bit rate capacity of a single transponder and N is the number of transponders allocated to the high band width serial data stream) for high-speed delivery of video and other multimedia content. The memory storage devices 150 may include hard disk drives. Alternatively, memory storage may be provided for the high speed serial data stream 154 itself, with the advent of high speed memory storage devices not currently available but projected to be commercially available in the 2000s. According to one advantageous embodiment, the receivers 146 are adapted to demodulate the downlink transponder signals according to a DVB protocol using QPSK, 8PSK, or other modulation known in the art. According to another advantageous embodiment, the receivers 146 are adapted to decode an MPEG-encoded video data stream.

Figure 9:
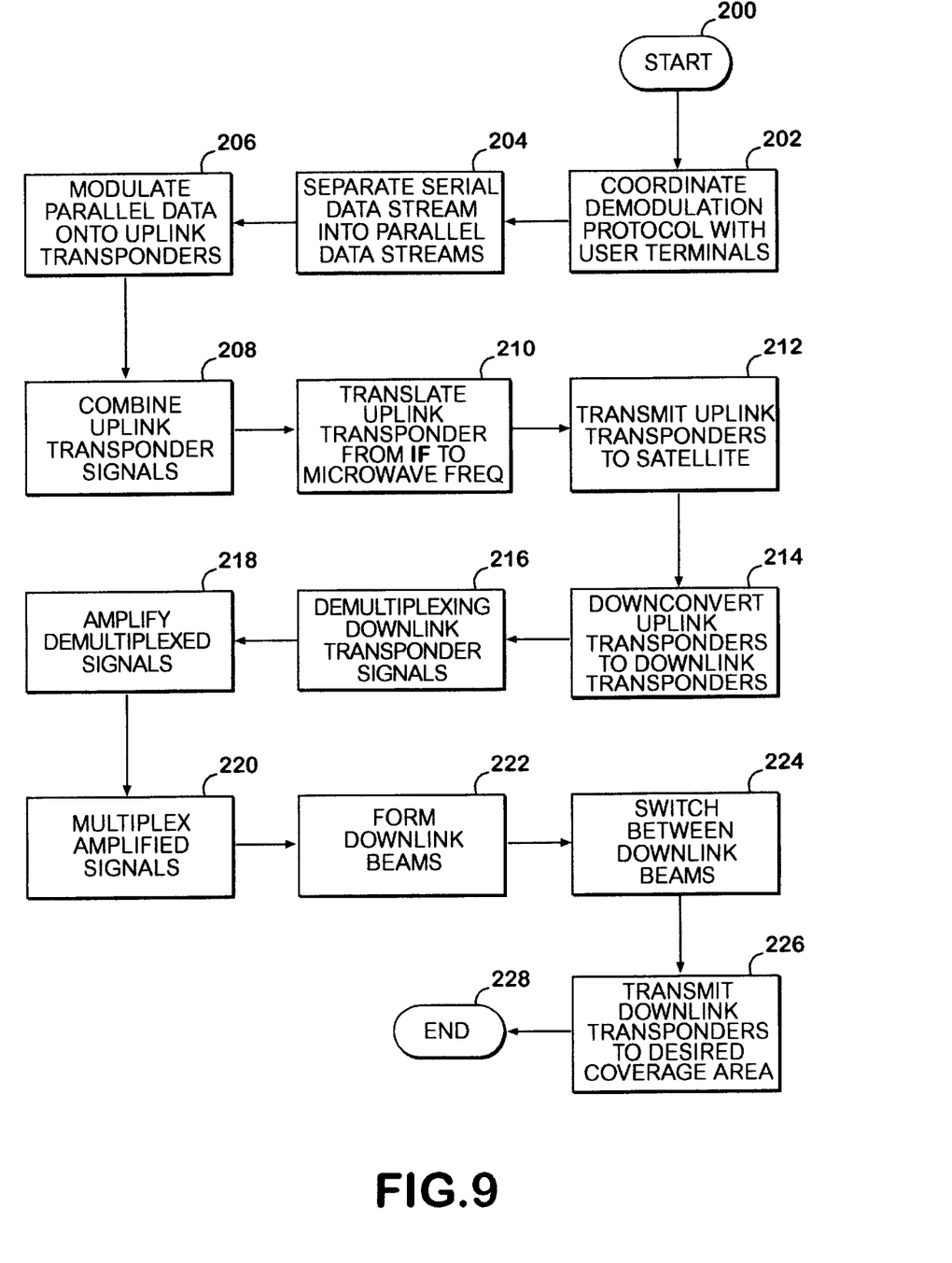
FIG. 9 is a flow diagram illustrating the steps in a method for delivering broadband information over a multicasting satellite according to one exemplary embodiment of the present invention.

Turning now to FIGS. 5, 6, 7 and 9, the steps in a method for rapidly delivering broadband information over a multicasting satellite according to one exemplary embodiment of the present invention are illustrated in flow chart form in FIG. 9. The method begins at step 200. At step 202, hub 50 coordinates the modulation and demodulation protocol to be used to encode the serial digital data stream with user terminals 70. A DVB protocol using QPSK or 8PSK modulation may be used, as is known in the art. Other protocols and modulation techniques as are known in the art may also be used without departing from the invention.

At step 204, a data separator such as serial adaptor 80 separates the serial data stream into parallel data streams, and the parallel data streams are individually modulated at an intermediate frequency (IF) into separate uplink transponder signals in step 206 as performed by individual modulators 84. In step 208, the uplink transponder signals are combined in summer 86. The method then proceeds to step 210, at which step the uplink transponder signals are preferably translated from an intermediate frequency to a microwave frequency by mixing local oscillator 88 with the IF signal in mixer 90. At step 212, the uplink transponder signals, having been recombined in summer 86 and translated to an RF frequency, such as a microwave frequency, are then transmitted to a satellite through hub antenna 52, preferably after being amplified by hub amplifier 94.

The method then proceeds to step 214, at which step the satellite 60 downconverts the uplink transponder signals to downlink transponder frequencies in mixer 106. In step 216, the downlink transponder signals are preferably demultiplexed using input multiplexer 108 to produce individual transponder downlink signals. In one exemplary embodiment, a system operating over standard Ku band frequencies would include a plurality of transponder signals each with a bandwidth of 36 MHz. At step 218, the demultiplexed transponder signals are preferably individually amplified using power amplifiers 112 before being multiplexed together at step 220 in output multiplexer 114.

At step 222, downlink beams are formed using antenna assembly 118 to illuminate the desired coverage area 72 on the earth with the downlink transponder signals. In one embodiment, the beam forming network 118 is adapted to sequentially switch at step 224 between downlink spot beams 124a, b, c to deliver information to the respective spot coverage areas. At step 226, the downlink transponder signals are transmitted through antenna assembly 122 to the desired beam coverage areas 72 on the ground, and the method then ends at step 228.

Figure 10:
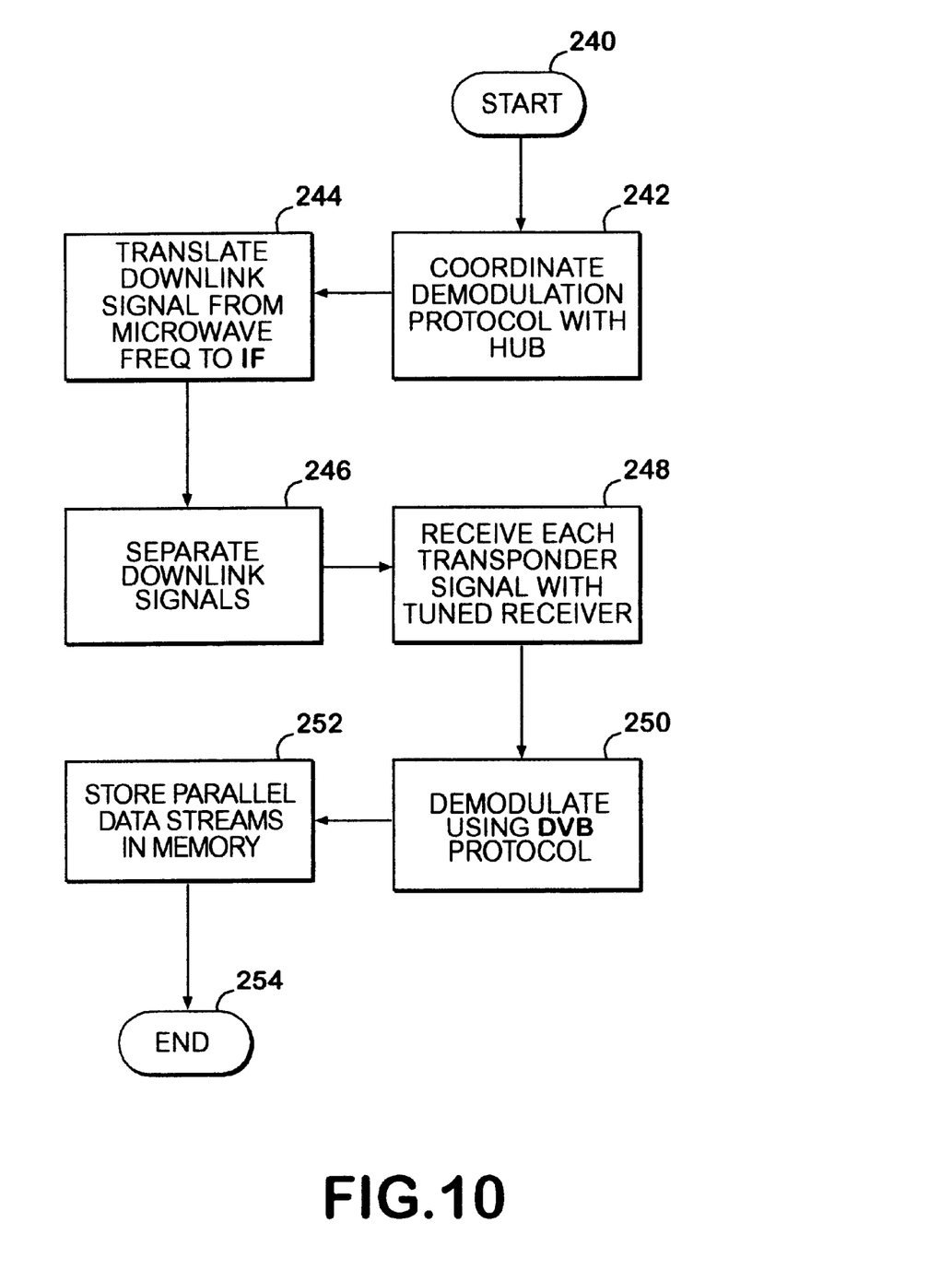
FIG. 10 is a flow diagram illustrating the steps in a method for receiving broadband information from a multicasting satellite according to one exemplary embodiment of the present invention.

Referring now to FIGS. 5, 8, and 10, the steps in a method for receiving broadband information from a multicasting satellite according to one exemplary embodiment of the present invention are illustrated in flow chart form in FIG. 10. The method starts at step 240. At step 242, the protocol for digital data modulation, demodulation, and serialization are preferably coordinated among user terminals 70 and hub 50. At step 244, user terminal 70 receives downlink transponder signals 65 from the satellite 60 and translates those microwave frequency signals to an intermediate frequency in mixer 138. The downlink transponder signals are then separated in a signal splitter 142 according to step 246. The signal separating step may be accomplished by a passive power divider, for example, as is well known in the art.

At step 248, each of the separated transponder signals are then received by a separate receiver 146. Demodulation is accomplished in receivers 146, such as using a DVB protocol, to generate parallel data streams, each corresponding to the parallel data stream modulated onto the uplink transponder signals by the hub 50. In one embodiment, the method proceeds to step 252 and each of the parallel digital data streams is buffered into memory 150 before the high data rate serial data stream is regenerated by serial adapter 152. According to another embodiment of the invention, the individual parallel data streams are recombined without buffering to regenerate in real time the full high data rate serial data stream. The method then ends at step 254.

Accordingly, the method according to one exemplary embodiment as illustrated in the flow diagram of FIG. 10 includes receiving several modulated transponder signals from the satellite, demodulating the individual transponder signals to form a plurality of parallel data streams, and serializing the parallel data streams to regenerate the original high data rate serial data stream. A small, inexpensive user terminal can thus receive a large amount of data during a short time period according to the method.

From the foregoing, it will be appreciated that the exemplary embodiments of the present invention overcome the limitations of the prior art described herein. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is to be limited only by the claims.

What is claimed is:

1. A broadband multicasting system for distributing information to a plurality of user terminals located within a downlink beam, the multicasting system comprising:
  a hub adapted to:
    convert a serial data stream from a single source containing information into a plurality of parallel related data streams;
    with separate modulators, modulate each of a plurality of uplink transponder signals with a respective one of the parallel, related data streams to form related uplink transponder signals; and
    direct the related modulated uplink transponder signals through free space; and
  an earth-orbiting communications satellite adapted to:
    receive the related uplink transponder signals and convert them into respective related downlink transponder signals; and
    direct the related downlink transponder signals to a desired coverage area on the earth in which the related downlink transponder signals can be combined and converted back into the serial data stream.

2. The broadband multicasting system according to claim 1 wherein the communications satellite comprises an uplink downconverted adapted to downconvert the related uplink transponder signals to respective related downlink transponder signals.

3. The broadband multicasting system according to claim 2 wherein the communications satellite further comprises an input multiplexer adapted to separate the related downlink transponder signals.

4. The broadband multicasting system according to claim 3 wherein the communications satellite further comprises a plurality of power amplifiers adapted to amplify the respective related downlink transponder signals.

5. The broadband multicasting system according to claim 4 wherein the communications satellite further comprises an output multiplexer adapted to combine the amplified related downlink transponder signals and deliver the combined related downlink transponder signals to the antenna.

6. The broadband multicasting system according to claim 1 wherein the communications satellite comprises a spot beam antenna comprising:
   a plurality of antenna feeds adapted to form a plurality of downlink beams, wherein each downlink beam is associated with a respective spot coverage area on the earth; and
   a beam forming network adapted to sequentially deliver the related downlink transponder signals to each of a plurality of subsets of the antenna feeds, wherein each antenna feed subset is associated with a downlink beam.

7. The broadband multicasting system according to claim 6 wherein the spot beam antenna further comprises an antenna reflector for forming, in conjunction with the antenna feeds, downlink beams.

8. The broadband multicasting system according to claim 6 wherein the spot beam antenna further comprises an antenna lens for forming, in conjunction with the antenna feeds, downlink beams.

9. The broadband multicasting system according to claim 1 wherein the hub comprises an upconverter adapted to translate the related uplink transponder signals from an intermediate frequency to a microwave frequency.

10. The broadband multicasting system according to claim 9 wherein the hub further comprises a high power amplifier adapted to amplify the translated and related transponder signals.

11. The broadband multicasting system according to claim 1 wherein the hub is adapted to modulate each of the plurality of related uplink transponder signals with a respective one of the parallel data streams according to a DVB or other protocol known in the art.

12. The broadband multicasting system according to claim 1 wherein the hub is adapted to modulate each of the plurality of related uplink transponder signals with a respective one of the related parallel data streams using 8PSK modulation.

13. The broadband multicasting system according to claim 1 wherein the hub comprises a serial interface adapted to convert the serial data stream into the plurality of related parallel data streams.

14. The broadband multicasting system according to claim 13 wherein the serial interface is adapted to convert an M×N bits per second serial data stream into the plurality of related parallel data streams wherein M is the maximum bit rate available to be modulated on an individual transponder suing a modulating protocol and N is the number of transponders dedicated to the high speed serial data stream.

15. The broadband multicasting system according to claim 1 wherein the hub is adapted to coordinate the uplink transponder signal modulation with user terminals within the desired coverage area that receive the downlink transponder signals from the communications satellite.

16. A user terminal for receiving broadband information over a plurality of transponders transmitted by a communications satellite, wherein the user terminal is located in one of a plurality of beam coverage areas on the earth that are produced by an antenna on the communications satellite, the terminal comprising:
   a signal splitter adapted to separate related transponder signals received from the communications satellite, the transponder signals relating to a single serial data stream;
   a plurality of receivers adapted to demodulate the respective related transponder signals to produce a plurality of respective parallel and related data streams; and
   a buffer adapted to convert the parallel and related data streams into the single serial data stream containing the broadband information, wherein a data rate of the serial data steam is maintained.

17. The user terminal according to claim 16 wherein the buffer comprises a plurality of memory storage devices adapted to store the data from the respective related parallel data streams.

18. The user terminal according to claim 17 wherein each of the memory storage devices comprises a hard disk drive.

19. The user terminal according to claim 16 further comprising a high speed memory storage device adapted to store the data from the serial data stream.

20. The user terminal according to claim 19 wherein the high speed memory storage device comprises a hard disk drive.

21. The user terminal according to claim 16 further comprising a block downconverted adapted to translate the transponder signals to an intermediate frequency from a microwave frequency.

22. The user terminal according to claim 16 wherein the receivers are adapted to demodulate the transponder signals according to a DVB protocol to in produce the related parallel data streams.

23. The user terminal according to claim 16 wherein the receivers are adapted to demodulate the transponder signals using 8PSK demodulation to produce the related parallel data streams.

24. The user terminal according to claim 16 wherein the receivers are adapted to decode an MPEG-encoded video data stream.

25. The user terminal according to claim 16 wherein the receivers are adapted to coordinate the transponder signal demodulation with a hub that sends the transponder signals to the communications satellite.

26. A method for delivering broadband information to the users, the method comprising the steps of:
   separating a single serial data stream comprising the broadband information into a plurality of related parallel data streams;
   modulating each of the related parallel data streams onto a respective one of a plurality of related uplink transponder signals;
   transmitting the related uplink transponder signals to an earth-orbiting satellite;
   at the satellite, converting the related uplink transponder signals to respective related downlink transponder signals;
   from the satellite, transmitting the related downlink transponder signals to a desired coverage area on the earth; and
   at the desired coverage area, converting the related downlink transponder signals back into the single serial data stream.

27. The broadband information delivery method according to claim 26 further comprising the step of translating the related uplink transponder signals from an intermediate frequency range to a microwave frequency range.

28. The broadband information delivery method according to claim 26 wherein the converting step comprises downconverting the related uplink transponder signals to respective related downlink transponder signals.

29. The broadband information delivery method according to claim 26 further comprising the step of forming a plurality of downlink spot beams at the satellite.

30. The broadband information delivery method according to claim 29 further comprising the step of switching between downlink spot beams.

31. The broadband information delivery method according to claim 26 further comprising the step of combining the related uplink transponder signals before the uplink transponder transmitting step.

32. The broadband information delivery method according to claim 26 further comprising the step of coordinating a demodulation protocol with a plurality of user terminals located within the desired coverage area.

33. The broadband information delivery method according to claim 26 further comprising the steps of:
demultiplexing the related downlink transponder signals to separate the related downlink transponder signals at the satellite;
amplifying each of the related demultiplexed downlink transponder signals; and multiplexing amplified related downlink transponder signals before the transmitting step.

34. A method for receiving broadband information from a multicasting satellite at a user terminal located within a desired coverage area of the satellite, the method comprising the steps of:
separating a plurality of related downlink transponder signals from the multicasting satellite, wherein the downlink related transponder signals include subsets of the broadband information and correspond to a single serial data stream;
demodulating each of the separated and related downlink transponder signals to produce respective related parallel data streams; and
buffering the related parallel data streams to produce the single serial data stream including the broadband information wherein the buffering process comprises converting the plurality of related parallel data streams into an M×N bits per second serial data stream, wherein M is the maximum bit rate available for modulation using a modulating protocol and N is the number of transponders dedicated to the high speed serial data stream, and wherein a data rate of the serial data stream is maintained.

35. The broadband information receiving method according to claim 34 wherein the buffering step comprises storing each of the related parallel data streams in a respective memory storage device.

36. The broadband information receiving method according to claim 34 wherein the demodulating step comprises demodulating each of the separated and related downlink transponder signals according to a DVB protocol.

37. The broadband information receiving method according to claim 34 further comprising the step of coordinating the demodulation step with a ground hub that sends the broadband information to the multicasting satellite.

38. The broadband information receiving method according to claim 34 further comprising the step of storing the serial data stream in a memory storage device.

39. The broadband information receiving method according to claim 34 wherein the demodulating step comprises demodulating each of the separated and related downlink transponder signals according to an MPEG protocol.

40. The broadband information receiving method according to claim 34 wherein the demodulating step comprises receiving each related downlink transponder signal with a receiver tuned to the respective downlink signal.

41. The broadband information receiving method according to claim 34 further comprising the step of translating the related downlink transponder signals from a microwave frequency range to an intermediate frequency range.

42. The broadband information receiving method according to claim 34 further comprising the step of transmitting a return channel signal back to the multicasting satellite.

* * * * *